United States Patent
Kim et al.

(10) Patent No.: US 12,248,634 B2
(45) Date of Patent: *Mar. 11, 2025

(54) APPARATUS AND METHOD FOR GENERATING PATTERN DATA, AND APPARATUS AND METHOD FOR REPRODUCING PATTERN DATA

(71) Applicant: CK MATERIALS LAB CO., LTD., Seoul (KR)

(72) Inventors: Hyeong Jun Kim, Seoul (KR); Jong Hun Lee, Seoul (KR)

(73) Assignee: CK MATERIALS LAB CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/418,512

(22) Filed: Jan. 22, 2024

(65) Prior Publication Data

US 2024/0160290 A1    May 16, 2024

Related U.S. Application Data

(63) Continuation of application No. 17/298,596, filed as application No. PCT/KR2019/015011 on Nov. 7, 2019, now Pat. No. 11,914,779.

(30) Foreign Application Priority Data

Nov. 30, 2018  (KR) .......................... 10-2018-0151680

(51) Int. Cl.
| | |
|---|---|
| *G06F 3/01* | (2006.01) |
| *G06F 3/041* | (2006.01) |
| *G06F 3/16* | (2006.01) |
| *H05B 45/20* | (2020.01) |

(52) U.S. Cl.
CPC ............ *G06F 3/016* (2013.01); *G06F 3/0416* (2013.01); *G06F 3/16* (2013.01); *H05B 45/20* (2020.01)

(58) Field of Classification Search
None
See application file for complete search history.

(56) References Cited

U.S. PATENT DOCUMENTS

| | | | |
|---|---|---|---|
| 2012/0206247 A1 | 8/2012 | Bhatia et al. |
| 2018/0108225 A1 | 4/2018 | Mappus et al. |
| 2019/0129608 A1 | 5/2019 | Kim et al. |
| 2020/0225751 A1 | 7/2020 | Kim et al. |
| 2020/0230647 A1 | 7/2020 | Shim et al. |
| 2021/0365122 A1 | 11/2021 | Kim |

FOREIGN PATENT DOCUMENTS

| | | |
|---|---|---|
| CN | 112204504 A | 1/2021 |
| EP | 2624099 A1 | 8/2013 |
| KR | 10-2013-0090299 A | 8/2013 |
| KR | 1020170120473 A | 10/2017 |
| KR | 1020180097382 A | 8/2018 |
| KR | 1020180112137 A | 10/2018 |
| KR | 101901364 B1 | 11/2018 |

*Primary Examiner* — Adolf Dsouza
(74) *Attorney, Agent, or Firm* — NKL Law; Jae Youn Kim

(57) ABSTRACT

An apparatus and method for generating and reproducing pattern data is provided. The apparatus for generating pattern data includes an input data reception unit for receiving input data according to a user selection; a controller for determining pattern information on the basis of the input data and generating pattern data including the determined pattern information; and a communication unit for transmitting the generated pattern data to the apparatus for reproducing pattern data.

6 Claims, 7 Drawing Sheets

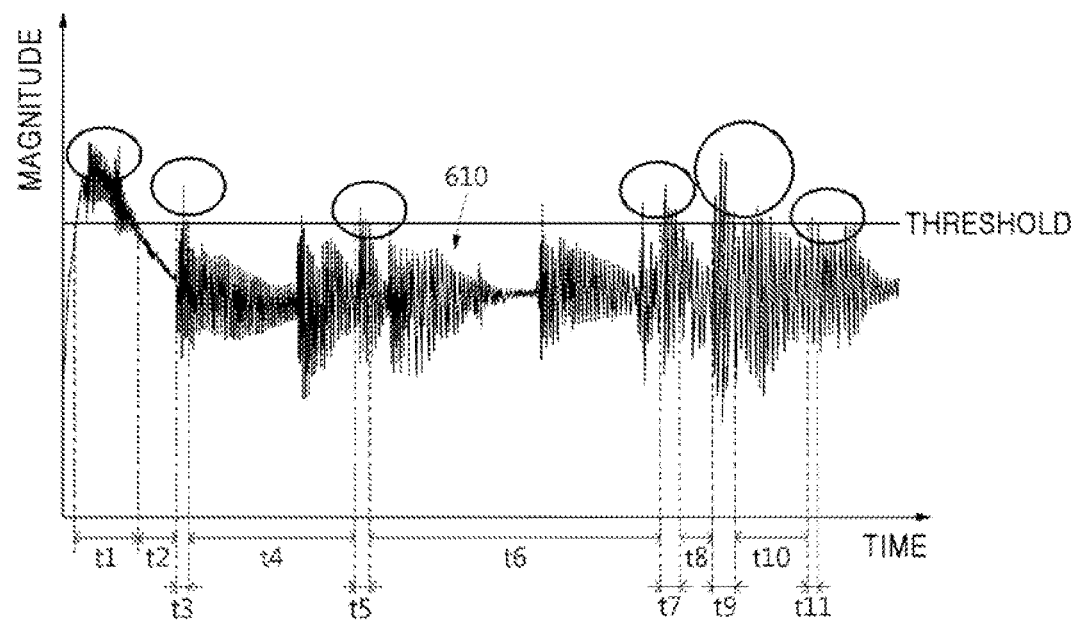
FIG. 6
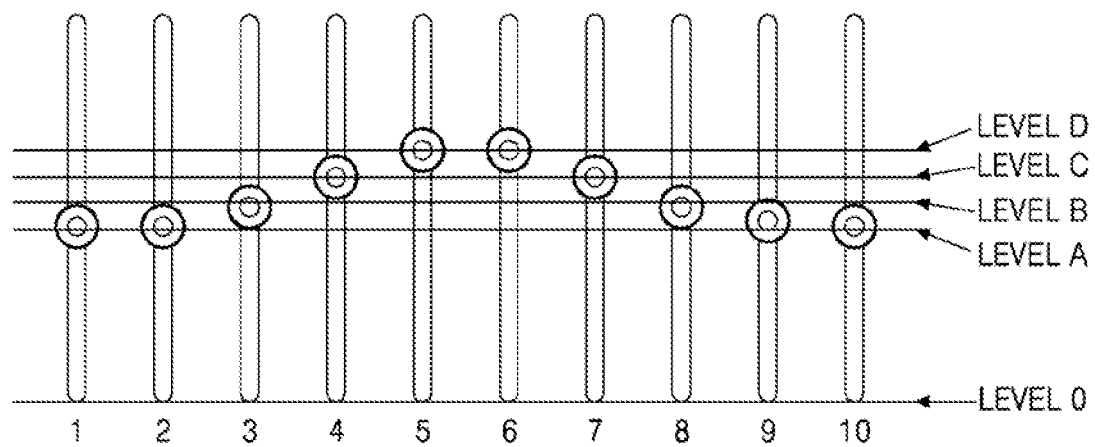
FIG. 7
| TAG | LENGTH | VALUE |
FIG. 8

APPARATUS AND METHOD FOR GENERATING PATTERN DATA, AND APPARATUS AND METHOD FOR REPRODUCING PATTERN DATA

This application is a continuation of U.S. application Ser. No. 17/298,596, filed on May 30, 2021, which is a National Stage of International patent application PCT/KR2019/015011, filed on Nov. 7, 2019, which claims priority of foreign Korean patent application No. 10-2018-0151680, filed on Nov. 30, 2018, the disclosures of which are incorporated by reference in their entirety.

BACKGROUND/SUMMARY

Technical Field

The following embodiments relate to a pattern data generation technology and a pattern data generation technology.

Background Art

As the cultural industry develops, types of content which entertains consumers, such as a concert and a video game, are diversified. Consumer demand for a method of providing visually immersive content, such as virtual reality (VR), three-dimensional (3D) video, and four-dimensional (4D) experience, is increasing. In accordance with such a trend, interest in haptic devices that provide haptic feedback to users is gradually increasing. The haptic device may control a haptic stimulus provided by the haptic device by adjusting an amount of current flowing through the haptic device and a magnitude of voltage applied to the haptic device.

Technical Solution

An apparatus for generating pattern data according to an embodiment may include: an input data reception unit configured to receive input data according to a user selection; a controller configured to determine pattern information based on the input data and generate pattern data including the determined pattern information; and a communication unit configured to transmit the generated pattern data to an apparatus for reproducing pattern data.

The pattern data may include pattern information on at least one of a haptic pattern applied to an actuator or a light pattern applied to a lighting unit.

The controller may analyze the input data and determine pattern time interval information indicating a time interval at which a pattern is to be output and pattern level information indicating an intensity of the pattern based on the analysis result.

The input data reception unit may receive any one of sound data, touch input data, and user pattern setting data according to the user selection.

When the input data is the sound data, the controller may determine a target frequency band from among frequency bands constituting the sound data, filter sound data of the target frequency band using a bandpass filter, and determine pattern level information of a haptic pattern and pattern time interval information of the haptic pattern from the filtered sound data based on a threshold.

When the input data is the touch input data, the controller may extract retention time information of the touch input and time interval information of the touch input from the touch input data and generate pattern data of a haptic pattern based on the retention time information and the time interval information.

When the input data is the user pattern setting data, the controller may determine pattern level information and pattern time interval information based on the user pattern setting data and generate the pattern data based on the determined pattern level information and pattern time interval information.

The pattern data may be included in a message and transmitted to the apparatus for reproducing pattern data, and the message may include: a first element indicating a type of data included in the message; a second element including message information; and a third element indicating the size of the message information.

An apparatus for reproducing pattern data according to an embodiment may include: a communication unit configured to receive pattern data from an apparatus for generating pattern data, the pattern data including pattern information determined based on input data according to a user selection; a controller configured to extract pattern information from the received pattern data; and a haptic pattern reproduction unit configured to reproduce a haptic pattern based on the extracted pattern information.

The haptic pattern reproduction unit may reproduce the haptic pattern by driving an actuator based on pattern level information indicating the intensity of a pattern and time interval information indicating a time interval at which the pattern is to be output, wherein the pattern level information and the time interval information are included in the pattern information.

The apparatus for reproducing pattern data according to an embodiment may further include a light pattern reproduction unit configured to reproduce a light pattern based on the extracted pattern information.

The light pattern reproduction unit may reproduce the light pattern by driving a lighting unit based on lighting color information of the light pattern and output time information of the light pattern which are included in the pattern information.

A method of generating pattern data according to an embodiment may include the steps of: receiving input data according to a user selection; determining pattern information based on the input data; generating pattern data including the determined pattern information; and transmitting the generated pattern data to an apparatus for reproducing pattern data.

A method of reproducing pattern data according to an embodiment may include the steps of: receiving pattern data from an apparatus for generating pattern data, the pattern data including pattern information determined based on input data according to a user selection; extracting pattern information from the received pattern data; and reproducing a haptic pattern based on the extracted pattern information.

The method of reproducing pattern data according to an embodiment may further include reproducing a light pattern based on the pattern information on the light pattern when the pattern data includes pattern information on the light pattern.

DESCRIPTION OF DRAWINGS

FIGS. 5 and 6 are diagrams for describing an example of generating pattern data based on sound data according to an embodiment.

FIG. 7 is a diagram for describing user pattern setting data according to an embodiment.

FIG. 8 is a diagram illustrating elements of a message including pattern data according to an embodiment.

MODE FOR INVENTION

Figure 1:
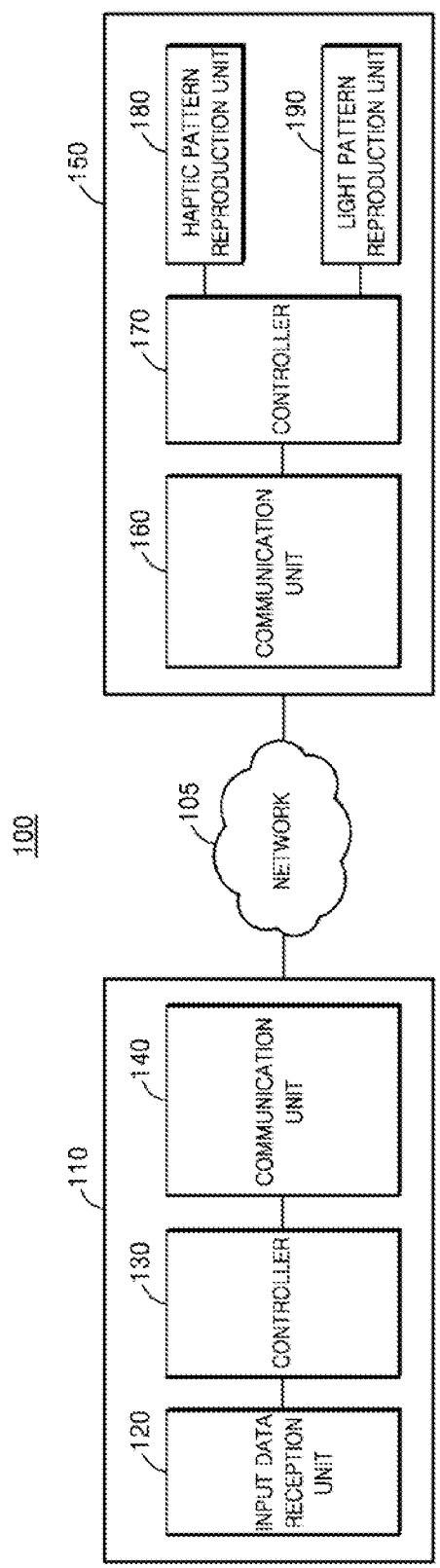
FIG. 1 is a diagram illustrating a system for providing pattern data according to an embodiment.

Hereinafter, some example embodiments will be described in detail with reference to the accompanying drawings. The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms used herein are used only to explain the example embodiments, not to limit the same. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein. Also, in the description of embodiments, detailed description of well-known related structures or functions will be omitted when it is deemed that such description will cause ambiguous interpretation of the present disclosure.

In addition, like reference numerals refer to like constituent components and a repeated description related thereto will be omitted. When it is determined detailed description related to a related known function or configuration they may make the purpose of the examples unnecessarily ambiguous in describing the examples, the detailed description will be omitted here.

FIG. 1 is a diagram illustrating a system for providing pattern data according to an embodiment.

A system 100 for providing pattern data is a system for providing a haptic stimulus (haptic effect) and/or a light stimulus (light effect) to a user based on pattern data. For example, the system 100 for providing pattern data may generate pattern data that corresponds to beat pattern of content to be provided to audiences in places, such as a concert hall, a movie theater, a performance hall, and the like, and transmit the generated pattern data to the audiences. The audiences may wear a wearable device, and the wearable device may receive the pattern data. The wearable device may provide a haptic stimulus and/or a light stimulus that matches the content to the audiences by reproducing the pattern data. The audiences may experience a higher level of immersion through the haptic stimulus and/or the light stimulus and the effect of providing content (performance effect) may be maximized.

In another example, it is assumed that a user listens to music content using a driving device on which a music playback application is executed. In this case, the system 100 for providing pattern data may analyze music content to generate pattern data matching the music content, and provide the user with a haptic stimulus and/or a light stimulus corresponding to the music content by reproducing the pattern data using an accessory device that can be wired or wirelessly connected to the above driving device.

In still another example, the user may directly create pattern data through the system 100 for providing pattern data. The user may generate unique pattern data by setting a time interval at which a pattern of a haptic stimulus or a light stimulus occurs and the intensity of the pattern. The user may generate his or her own unique pattern data through touch input, for example, tapping or rubbing. The generated pattern data may be stored and transmitted to a device or other users.

Referring to FIG. 1, the system 100 for providing pattern data according to an embodiment includes an apparatus 110 for generating pattern data and an apparatus 150 for reproducing pattern data. The apparatus 110 for generating pattern data is an apparatus for generating pattern data, and may include, for example, a personal computer, a mobile device, such as a smartphone, and the like. The apparatus 110 for generating pattern data may generate pattern data and transmit the generated pattern data. For example, the apparatus 110 for generating pattern data may analyze content (e.g., sound data, such as music) and generate pattern data that corresponds to the content, or generate pattern data based on touch input data or user pattern setting data input by a user. The pattern data thus generated may include pattern information that defines a pattern of a haptic stimulus and/or a light stimulus to be provided to a user.

The apparatus 50 for reproducing pattern data is an apparatus for providing a haptic stimulus and/or a light stimulus to the user based on the pattern data received from the apparatus 110 for generating pattern data. The apparatus 150 for reproducing pattern data may be referred to as a "haptic apparatus". In one embodiment, the apparatus 150 for reproducing pattern data may provide a haptic stimulus of a specific pattern to the user by generating a vibration or tapping sensation by reproducing the pattern data. In addition, the apparatus 150 for reproducing pattern data may provide a visual stimulus of a specific pattern to the user by adjusting the lighting color and illumination intensity of a lighting unit, such as a light emitting diode (LED), by reproducing the pattern data. The apparatus 150 for reproducing pattern data may be in the form of, for example, a wearable device, an accessory device of a mobile device, a portable electronic device, or the like, but the form thereof is not limited thereto.

As illustrated in FIG. 1, the apparatus 110 for generating pattern data and the apparatus 150 for reproducing pattern data may be wirelessly connected through a network 105 or may be wired connected through a cable.

The apparatus 110 for generating pattern data includes an input data reception unit 120, a controller 130, and a communication unit 140. The input data reception unit 120 receives input data according to a user selection. The input data reception unit 120 may receive any one of sound data, touch input data, and user pattern setting data according to a user selection. In the case of touch input data, it may be obtained by sensing touch input, such as tapping or rubbing, performed by the user on a touch screen display or the like. The user pattern setting data may be obtained by the user directly setting a pattern level or a pattern time interval through an interface, such as an equalizer. The user may select which of the sound data, the touch input data, or the user pattern setting data is to be used to generate the pattern data.

The controller 130 may control the operation of the apparatus 110 for generating pattern data and include one or more processors. The controller 130 may determine pattern information based on the input data received through the input data reception unit 120 and generate pattern data including the determined pattern information. The controller 130 may analyze the input data and determine pattern time interval information indicating a time interval at which a pattern is to be output and pattern level information indicating a pattern intensity on the basis of the analysis result. The pattern data may include pattern information on at least one of a haptic pattern applied to an actuator or a light pattern applied to the lighting unit. In one embodiment, the controller 130 may determine pattern level information of a haptic pattern, pattern time interval information of the haptic pattern, lighting color information of a light pattern, and output time information of the light pattern based on the input data, and may control the determined information to be stored.

In one embodiment, it is assumed that the input data is sound data. In this case, the controller 130 may automatically extract pattern information from the sound data. The controller 130 may determine a target frequency band from among frequency bands constituting the input sound data, and extract sound data of the audible sound region by filtering sound data of the target frequency band using a bandpass filter. The controller 130 may determine pattern level information and pattern time interval information of the haptic pattern from the filtered sound data based on a threshold.

For example, when the input data reception unit 120 receives sound data of a wave file or an MP3 file as input data, the controller 130 may analyze the sound data in a frequency domain by performing fast Fourier transform (FFT) on an intro part (e.g., a portion of about 1 minute), which is reproduced in the first half of the sound data, at a predetermined time period (e.g., 200 ms) and determine the most repetitive frequency band (the frequency band with the largest FFT value) as the target frequency band. In this way, the controller 130 may determine the target frequency band in which pattern data is to be formed in the initial first half of sound data, such as music. Thereafter, the controller 130 performs bandpass filtering and inverse fast Fourier transform (IFFT) to output the filtered sound data in a time domain. The controller 130 may determine pattern level information and pattern time interval information by comparing a signal value of the sound data undergone IFFT and converted into the time domain with a predetermined threshold (which may be set by the user). For example, if the signal value of the IFFT-processed sound data is greater than or equal to the threshold, the controller 130 may determine the pattern level based on a difference between the signal value and the threshold. If the signal value is less than the threshold, the controller 130 may treat the pattern level as 0. The pattern level may be determined as a digital value between, for example, 0 and 10. The controller 130 may detect times when the signal value is greater than or equal to the threshold, and determine pattern time interval information based on the interval between the detected times.

In addition, the controller 130 may determine the lighting color information of the light pattern based on the target frequency band, and determine output time information of the light pattern indicating the timing at which the light pattern is output based on the pattern time interval information. For example, the color of the light pattern may be differently determined according to a value of the target frequency band, and the time at which the light pattern is to be output may be determined based on the pattern time interval derived by analyzing the sound data.

In another embodiment, it is assumed that the input data is touch input data. The user may simply generate pattern data through touch input, and the generated touch input data may include time interval information indicating a time interval at which the touch is input, retention time information indicating a time period for which the touch is maintained, and intensity information of the touch input. The controller 130 may automatically extract pattern information from the touch input data. The controller 130 may extract the retention time information of the touch input and the time interval information of the touch input from the touch input data, and generate pattern data of a haptic pattern based on the extracted retention time information and time interval information. The controller 130 may set a reproduction start time of the haptic pattern based on the corresponding retention time information, and set a reproduction stop time of the haptic pattern based on the corresponding time interval information.

In addition, the controller 130 may determine output time information of the light pattern based on the retention time information and time interval information extracted through the analysis of the touch input data. In addition, the controller 130 may determine lighting color information of the light pattern based on the intensity of the touch input. For example, the controller 130 may determine the lighting color information in such a manner that the proportion of blue is increased when the intensity of the touch input is weak and the proportion of red is increased when the intensity of the touch input is strong.

In still another embodiment, it is assumed that the input data is user pattern setting data. The controller 130 may determine pattern level information and pattern time interval information based on the user pattern setting data, and generate pattern data based on the determined pattern level information and pattern time interval information. For example, the user may input setting information for generating pattern data using a pattern input program in the form of an equalizer or the like, and the input setting information may be input to the input data reception unit 120 as user pattern setting data. The controller 130 may converts the user pattern setting data into a pattern level of a digital value and determine a time interval of a pattern. For example, when the user sets a pattern level value for each frequency band, the controller 130 may generate the pattern data so that a haptic pattern of the pattern level value set for each frequency band is generated for each time period corresponding to the frequency band.

In addition, the controller 130 may determine lighting color information and output time information of the light pattern based on the pattern level information and pattern time interval information determined through the analysis of the user pattern setting information. For example, the controller 130 may determine a lighting color based on the magnitude of the determined pattern level, and determine a time at which the light pattern is to be output based on the pattern time interval information.

The communication unit 140 may transmit the generated pattern data to the apparatus 150 for reproducing pattern data. In this case, the pattern data may be included in a message and transmitted to the apparatus 150 for reproducing pattern data. The communication unit 140 may transmit the pattern data to the apparatus 150 for reproducing pattern data through the network 105, such as Bluetooth, Bluetooth low energy (BLE), Wi-Fi, long term evolution (LTE), or the like. In one embodiment, the user may select the type of the network 106 through which the pattern data is to be transmitted, and in this case, the communication unit 140 may transmit the pattern data through the network 105 selected by the user.

According to the embodiment, upon completion of the transmission of the pattern data, the apparatus 110 for generating pattern data may notify the user of the completion of transmission of the pattern data. In addition, the apparatus 110 for generating pattern data may store the transmitted pattern data and generate and manage history information. The stored pattern data may later be transmitted to another device or to another user.

The apparatus 150 for reproducing pattern data receives the pattern data from the apparatus 110 for generating pattern data and reproducing the received pattern data. The apparatus 150 for reproducing pattern data includes a communication unit 160, a controller 170, and a haptic pattern reproduction unit 180. According to an embodiment, the apparatus 150 for reproducing pattern data may further include a light pattern reproduction unit 190.

The communication unit 160 receives the pattern data from the apparatus 110 for generating pattern data. The pattern data may include the pattern information determined based on the input data according to the user selection. According to the embodiment, when the reception of the pattern data is completed, the received pattern data may be stored in a storage unit (not shown), or the user of the apparatus 150 for reproducing pattern data may be notified of the completion of reception of the pattern data.

The controller 130 may control the operation of the apparatus 150 for reproducing pattern data and include one or more processors. The controller 170 may extract pattern information from the pattern data by analyzing the received pattern data. For example, the controller 170 may extract the pattern level information of the haptic pattern, the pattern time interval information of the haptic pattern, the lighting color information of the light pattern, the output time information of the light pattern, and the like from the pattern data.

The haptic pattern reproduction unit 180 reproduces the haptic pattern based on the extracted pattern information. The haptic pattern reproduction unit 180 may reproduce the haptic pattern by driving an actuator (a tactile actuator or the like) based on the pattern level information indicating the intensity of the pattern and the time interval information indicating a time interval at which the pattern is to be output, wherein the pattern level information and the time interval information are included in the pattern information. The actuator may generate a haptic stimulus according to the haptic pattern based on a control signal transmitted from the haptic pattern reproduction unit 180. According to an embodiment, the actuator may be included in the haptic pattern reproduction unit 180.

The light pattern reproduction unit 190 reproduces the light pattern based on the extracted pattern information. The light pattern reproduction unit 190 may reproduce the light pattern by driving a lighting unit based on the lighting color information of the light pattern and the output time information of the light pattern, which are included in the pattern information. For example, the lighting unit, such as an LED, may be mounted in a wearable device, and the lighting unit may generate a light stimulus according to the light pattern based on a control signal transmitted from the light pattern reproduction unit 190. According to an embodiment, the lighting unit may be included in the light pattern reproduction unit 190.

Figure 2:
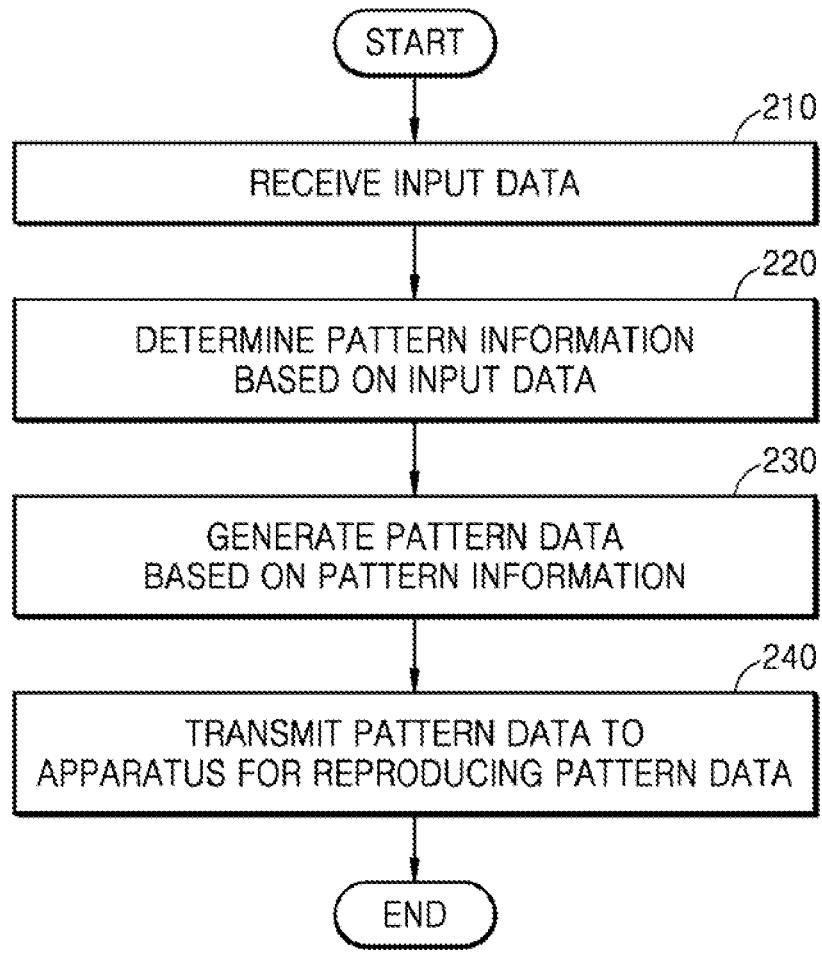
FIG. 2 is a flowchart illustrating a method of generating pattern data according to an embodiment.

FIG. 2 is a flowchart illustrating a method of generating pattern data according to an embodiment. The method of generating pattern data may be performed by the apparatus for generating pattern data described in the present description.

Referring to FIG. 2, in step 210, an apparatus for generating pattern data may receive input data according to a user selection. The apparatus for generating pattern data may receive any one of sound data, such as music, touch input data, and user pattern setting data according to a user selection.

The apparatus for generating pattern data determines pattern information based on the input data in step 220, and generates pattern data that includes the determined pattern information in step 230. The apparatus for generating pattern data may determine pattern time interval information indicating a time interval at which a pattern is to be output and pattern level information indicating the intensity of the pattern based on an analysis result of the input data. The pattern data may include pattern information on at least one of a haptic pattern applied to an actuator or a light pattern applied to a lighting unit.

Examples of information included in the pattern data are as shown in Table 1 below. According to an embodiment, the pattern data may include both information on the haptic pattern and information on the light pattern, or may include only any one of the information. Due to the structure of the pattern data, the occurrence time of the haptic pattern and the light pattern may be synchronized, or there may be a difference in the occurrence time between the haptic pattern and the light pattern.

TABLE 1

| Item | Description |
| --- | --- |
| Pattern level information | range: 1 to 10, indicating intensity of pattern |
| Pattern time interval information | unit: ms, range: 1 to 1000 ms |
| Lighting color information | R(red) value, G(green) value, B(blue) value |
| Output time information of light pattern | unit: ms, range: 1 to 1000 ms |

In step 240, the apparatus 240 for generating pattern data may transmit the generated pattern data to an apparatus for reproducing pattern data. The apparatus for generating pattern data may transmit the pattern data to the apparatus for reproducing pattern data through a wired network, such as a cable, or a wireless network, such as Bluetooth, BLE, Wi-Fi, LTE, or the like.

Figure 3:
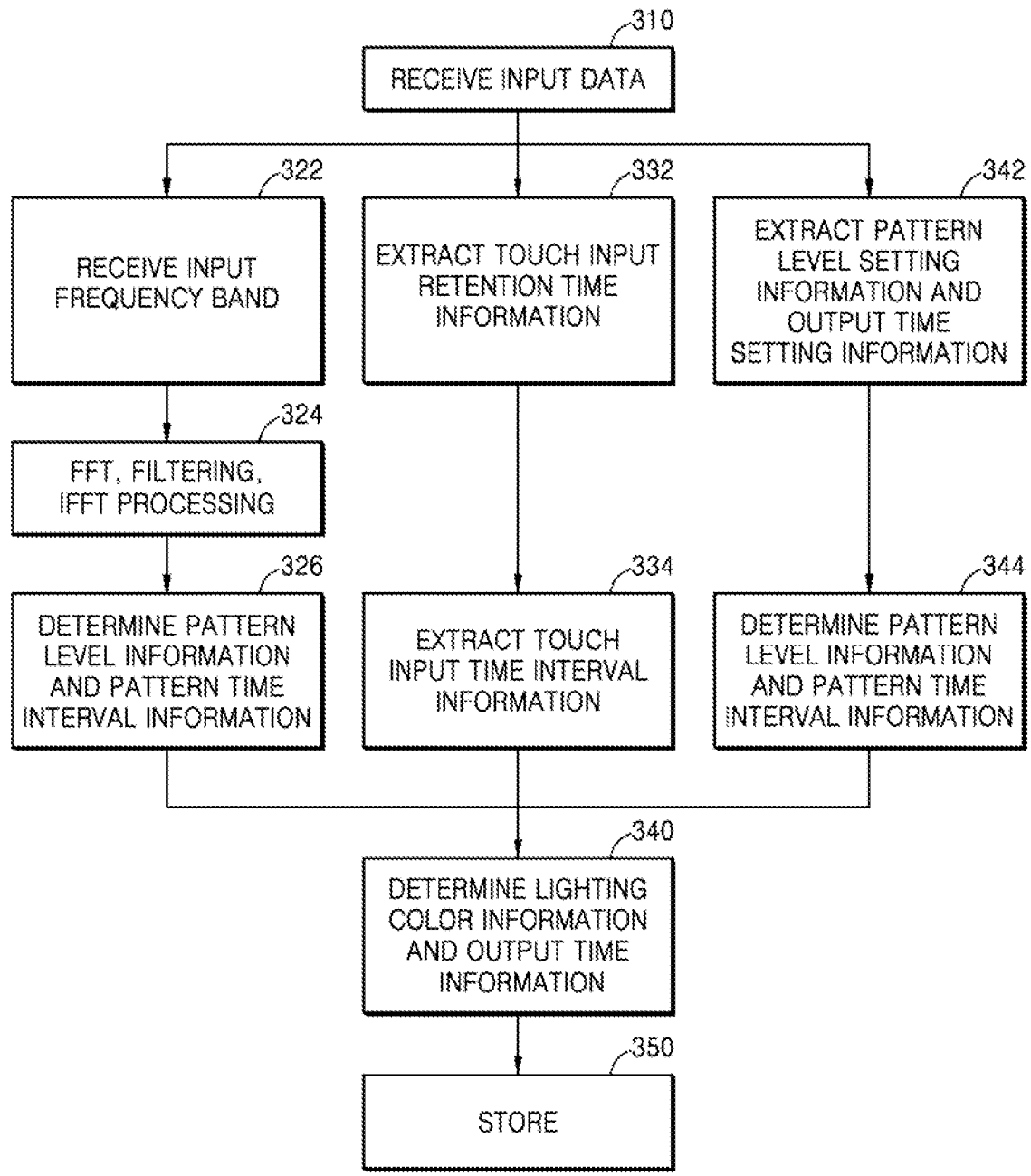
FIG. 3 is a flowchart for describing a process of generating pattern data according to a type of input data according to an embodiment.

FIG. 3 is a flowchart for describing a process of generating pattern data according to a type of input data according to an embodiment.

Referring to FIG. 3, in step 310, the apparatus for generating pattern data may receive input data to be used to generate pattern data, and check the type of the input data.

When it is checked that the input data is identified as sound data, the apparatus for generating pattern data may perform steps 322, 324, and 326. In step 322, the apparatus for generating pattern data may receive an input frequency band. The input frequency band is a frequency band to be used to form a haptic pattern in an initial part, such as an intro part of music content.

In step 324, the apparatus for generating pattern data may perform FFT processing, filtering processing, and IFFT processing on the sound data based on the input frequency band. The apparatus for generating pattern data may perform FFT processing on the sound data and perform filtering on the result of performing FFT processing based on the input frequency band. For example, the apparatus for generating pattern data may performing filtering on the input frequency band using a bandpass filter and may perform IFFT processing on the filtered sound data in the input frequency band. The apparatus for generating pattern data may determine pattern level information and pattern time interval information for the haptic pattern based on a threshold from the result of performing the IFFT processing.

Thereafter, in step 340, the apparatus for generating pattern data may determine lighting color information of a light pattern based on the input frequency band and determine output time information of the light pattern based on the pattern time interval information determined in step 326. In step 350, the apparatus for generating pattern data may store the pattern level information, the pattern time interval information, the lighting color information, and the output time information.

In step 310, when it is checked in step 310 that the type of the received input data is identified as touch input data, the apparatus for generating pattern data may perform steps 332 and 334. In step 332, the apparatus for generating pattern data may extract retention time information of touch input which indicates a time period for which touch is maintained from the touch input data. The apparatus for generating pattern data may set a reproduction start time of the haptic pattern based on the extracted retention time information. In step 334, the apparatus for generating pattern data may extract, from the touch input data, time interval information indicating a time interval at which the touch is input. The apparatus for generating pattern data may set a reproduction stop time of the haptic pattern based on the extracted time interval information.

Thereafter, in step 340, the apparatus for generating pattern data may determine lighting color information of a light pattern based on the intensity of the touch input and determine output time information of the light pattern based on the retention time information and the time interval information that are extracted in steps 332 and 334, respectively. In step 350, the apparatus for generating pattern data may store the pattern level information, the pattern time interval information, the lighting color information, and the output time information.

When it is checked in step 310 that the type of the received input data is identified as user pattern setting data, the apparatus for generating pattern data may perform steps 342, 344, and 346. In step 342, the apparatus for generating pattern data may extract pattern level setting information and output time setting information from the user pattern setting data. The user may input the pattern level setting information, the output time setting information, and setting information using a pattern input program for generating pattern data. Here, the pattern level setting information may include information on a pattern level directly set by the user, and the output time setting information may include information on an output time period set for each frequency band or an output time period directly set by the user. According to an embodiment, the apparatus for generating pattern data may performing filtering processing on the input data. In step 344, the apparatus for generating pattern data may determine pattern level information and pattern time interval information for the haptic pattern based on the pattern level setting information and the output time setting information.

Thereafter, in step 340, the apparatus for generating pattern data may determine lighting color information of a light pattern based on the pattern level information and determine output time information of the light pattern based on the pattern time interval information determined in step 344. In step 350, the apparatus for generating pattern data may store the pattern level information, the pattern time interval information, the lighting color information, and the output time information.

Figure 4:
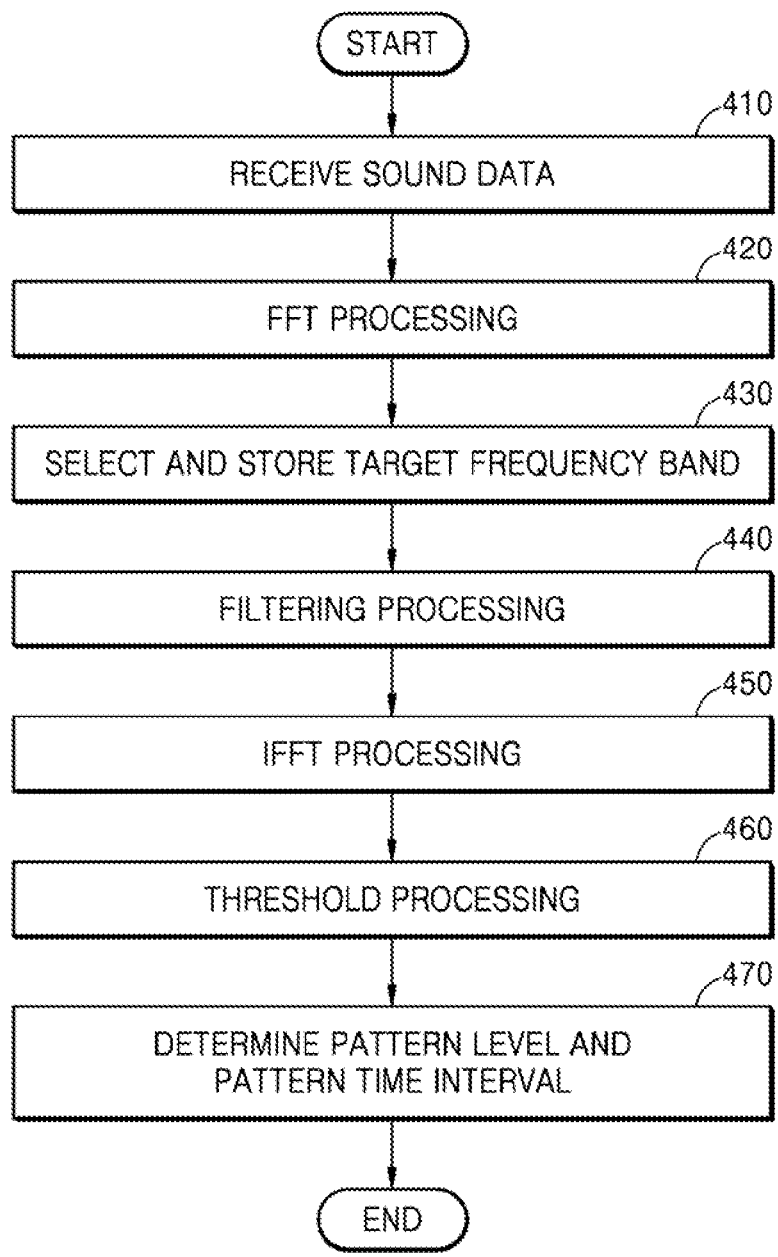
FIG. 4 is a flowchart for describing a process of generating pattern data based on sound data according to an embodiment.

FIG. 4 is a flowchart for describing a process of generating pattern data based on sound data according to an embodiment.

Referring to FIG. 4, in step 410, the apparatus for generating pattern data receives sound data. According to an embodiment, the apparatus for generating pattern data may perform preprocessing, such as noise removal for removing a bouncing signal value, on the received sound data. Also, the apparatus for generating pattern data may extract a portion to be used to determine a target frequency band from the sound data. For example, the apparatus for generating pattern data may extract an initial intro part from the sound data, and perform the following steps 420 to 470 on the extracted portion of the sound data.

In step 420, the apparatus for generating pattern data may convert the sound data from a time domain into a frequency domain by performing FFT processing on the sound data at a predetermined period. In step 430, the apparatus for generating pattern data may select a target frequency band from the sound data in the frequency domain and store information on the selected target frequency band. For example, the apparatus for generating pattern data may select a frequently repeated frequency band as the target frequency band. The apparatus for generating pattern data may divide the sound data for each frequency band, and select a frequency band including a frequency having the largest FFT-processed value as the target frequency band. The stored information on the target frequency band may later be used to determine pattern information of the light pattern.

In step 440, the apparatus for generating pattern data may perform filtering processing based on the target frequency band. For example, the apparatus for generating pattern data may extract an audible sound region (e.g., ranging from 10 Hz to 500 Hz) by performing filtering processing using a bandpass filter based on the target frequency band. In step 450, the apparatus for generating pattern data may convert the filtered sound data into time domain data by performing IFFT processing on the filtered sound data. The sound data may be converted from the frequency domain to the time domain through IFFT processing.

In step 460, the apparatus for generating pattern data may perform threshold processing. A threshold used in this process may be determined by the user. The apparatus for generating pattern data may extract signal values greater than or equal to a threshold from the sound data converted into the time domain through the IFFT processing.

In step 470, the apparatus for generating pattern data may determine a pattern level and a pattern time interval based on differences between the threshold and signal values extracted in step 460. For example, the apparatus for generating pattern data may allocate a large pattern level when a difference between the signal value and the threshold is large, and may allocate a small pattern level when the difference is small. The apparatus for generating pattern data may set a level to 0 for signal values smaller than the threshold in the sound data. According to an embodiment, the user may specify a reference time interval, and in this case, the apparatus for generating pattern data may determine the pattern time interval based on the reference time interval.

The apparatus for generating pattern data may determine the lighting color of the light pattern based on the target frequency band selected in step 430, and may determine the output time of the light pattern based on the pattern time interval determined in step 470.

Figure 5:
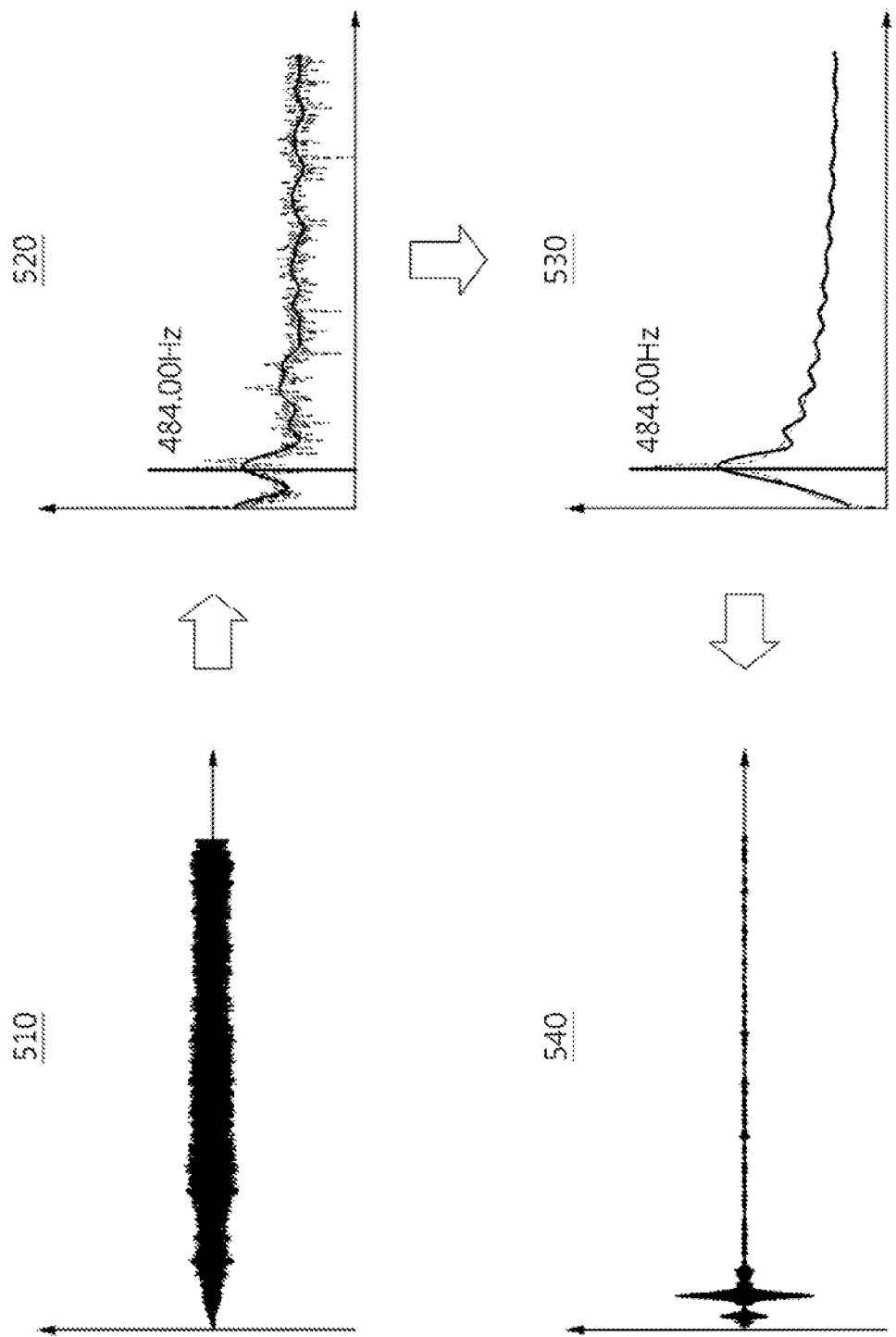

FIGS. 5 and 6 are diagrams for describing an example of generating pattern data based on sound data according to an embodiment.

Referring to FIG. 5, it is assumed that sound data 510 is input to generate pattern data. In the sound data 510, the x-axis represents "time," and the y-axis represents a "signal magnitude" or "signal value" of the sound data 510. FFT processing is performed on the sound data 510, and sound data 520 in a frequency domain is obtained by the FFT processing. In the sound data 520 in the frequency domain, the x-axis represents a "frequency," and the y-axis represents a "FFT value". In this embodiment, it is assumed that the frequency having the largest FFT value in the sound data 520 in the frequency domain is "484.00 Hz". This means that a frequency band of 484.00 Hz is repeated the most. The frequency of 484.00 Hz is selected as a target frequency, and a bandpass filtering processing is performed based on the target frequency to obtain filtered sound data 530. Thereafter, IFFT processing is performed on the filtered sound data 530 to obtain sound data 540 converted into a time domain. In the sound data 540 converted into the time domain, the x-axis represents "time," and the y-axis represents a "signal magnitude" or "signal value" of the sound data 540.

Thereafter, threshold processing as shown in FIG. 6 may be performed on the sound data converted into the time domain Referring to FIG. 6, a pattern level for a haptic pattern may be determined based on a difference between a signal level of sound data 610 and a threshold. For example, if the difference between the signal magnitude and the threshold is large, a large pattern level may be allocated, and if the difference is small, a small pattern level may be allocated. Here, the threshold can be specified by the user. The user may also specify a reference time interval, and a time interval of the pattern may be determined in proportion to the specified reference time interval.

FIG. 7 is a diagram for describing user pattern setting data according to an embodiment.

Referring to FIG. 7, a user may input setting information for generating pattern data using a pattern input program in the form of an equalizer as shown, and the input setting information may be user pattern setting data and transmitted to an apparatus for generating pattern data. The user may create his or her own pattern data through the pattern input program. The pattern input program may be driven by, for example, a personal computer or a smartphone.

In the illustrated pattern input program, "1 to 10" may correspond to different frequency bands or times. Each frequency band has a corresponding time period, and pattern time interval information of a haptic pattern may be determined based on the corresponding time period. In another embodiment, the pattern time interval information of the haptic pattern may be determined based on time information specified by the user. The user may set a level value (e.g., level A to level D) for each frequency band, and the pattern level information of the haptic pattern may be determined based on the level value set for each frequency band. In addition, lighting color information of a light pattern may be determined based on the level value set for each frequency band, and output time information of the light pattern may be determined based on the time period corresponding to each frequency band.

FIG. 8 is a diagram illustrating elements of a message including pattern data according to an embodiment.

In an embodiment, pattern data may be included in a message according to a message format as shown in FIG. 8 and transmitted to an apparatus for reproducing pattern data. An example in which pattern data is constructed using the basic encoding rules (BER) (tag-length-value (TLV) notation), which are encoding rules of Abstract Syntax Notation Number One (ASN.1), is shown.

A message includes a tag field, which is a first element indicating the type of data included in the message, a value field, which is a second element including message information, and a length field, which is a third element indicating the size of the message information. Here, the second element may include one or more of haptic pattern information and light pattern information. The tag field indicates the type of message. In an embodiment, if 0x43 (ASCII code "C," which is a randomly determined value) is included in the tag field, it may be recognized that haptic pattern information and light pattern information are included in the message. The length field may indicate the size of the message value in bytes. When the size of the message value exceeds 255 (0xFF) bytes, a value of 0x81 may be added to the front according to the BER method. For example, in the case of 260 bytes, the "length" may be set as "0x81 0x01 0x04".

The value field contains the information of the message. In some cases, the value field may include all information of the tag, length, and value. When the value field includes all information of the tag, length, and value, the second element, which is the value field, includes tag information for distinguishing data included in the message from among haptic pattern data, light pattern data, sound data, and emoticon data. Examples of the tag information are as shown in Table 2 below.

TABLE 2

| Tag value included in value field | Data contained in message |
|---|---|
| 0x01 | haptic pattern data |
| 0x02 | light pattern data |
| 0x03 | haptic pattern data and light pattern data |
| 0x04 | sound data |
| 0x05 | haptic pattern data and sound data |
| 0x06 | light pattern data and sound data |
| 0x07 | haptic pattern data, light pattern data, and sound data |
| 0x08 | emoticon data |
| 0x09 | haptic pattern data and emoticon data |
| ... | ... |
| 0x0F | haptic pattern data, light pattern data, sound data, and emoticon data |
| 0x10 to 0xFF | Reserved |

Figure 9:
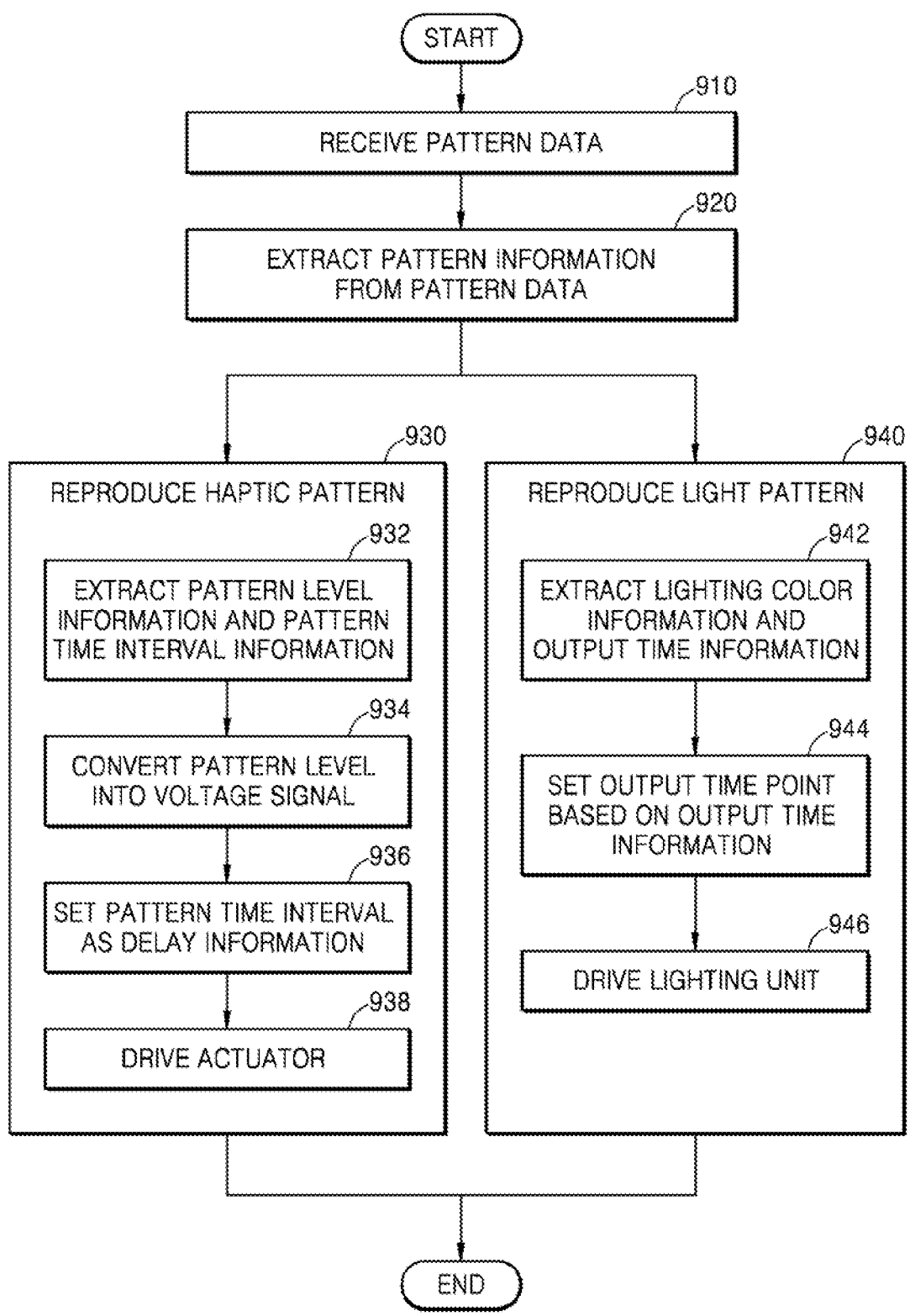
FIG. 9 is a flowchart illustrating a method of reproducing pattern data according to an embodiment.

FIG. 9 is a flowchart illustrating a method of reproducing pattern data according to an embodiment. The method of reproducing pattern data may be performed by the apparatus for reproducing pattern data described in the present description.

Referring to FIG. 9, in step 910, an apparatus for reproducing pattern data receives pattern data from an apparatus for generating pattern data. The pattern data may include pattern information determined based on input data according to a user selection. The pattern information may include one or more of haptic pattern information for a haptic pattern and light pattern information for a light pattern.

In step 920, the apparatus for reproducing pattern data analyzes the received pattern data and extract the pattern information from the pattern data. The apparatus for reproducing pattern data may extract pattern level information of the haptic pattern, pattern time interval information of the haptic pattern, lighting color information of the light pattern, output time information of the pattern, and the like from the pattern data.

When the pattern data includes pattern information on the haptic pattern, the apparatus for reproducing pattern data reproduces the haptic pattern based on the corresponding pattern information in step 930. In step 932, the apparatus for reproducing pattern data extract the pattern level information and pattern time interval information of the haptic pattern from the pattern information. In step 934, the apparatus for reproducing pattern data may convert a pattern level into a voltage signal to be applied to an actuator, on the basis of the pattern level information. In step 936, the apparatus for reproducing pattern data may set a pattern time interval indicated in the pattern time interval information as delay information to be applied to the generation of the haptic pattern. Accordingly, a time point at which the haptic pattern is to be generated may be determined. In step 938, the apparatus for reproducing pattern data may drive the actuator to generate a haptic stimulus corresponding to the pattern level at each point in time when the haptic pattern is generated.

When the pattern data includes pattern information on the light pattern, the apparatus for reproducing pattern data reproduces light pattern based on the corresponding pattern information in step 940. In step 942, the apparatus for reproducing pattern data extracts lighting color information and output time information of the light pattern from the pattern information. In step 944, the apparatus for reproducing pattern data may set an output time point of the light pattern based on the extracted output time information. In step 946, the apparatus for reproducing pattern data may drive a lighting unit, such as an LED, based on information on the set output time point and the lighting color information.

In one embodiment, when the pattern data includes both pattern information on the haptic pattern and pattern information on the light pattern, the apparatus for reproducing pattern data may simultaneously perform step 930 of reproducing the haptic pattern and step 940 of reproducing the light pattern.

The method according to an embodiment may be implemented as program instructions that can be performed through various computer means (e.g., a processor) and may be recorded on computer readable recording medium. The computer readable recording medium may include singular or combination of program instructions, data files, data structures, and so on. Program instructions recorded on the medium may be designed and configured especially for the embodiments of the present disclosure or may be already known and available to a person skilled in the computer software field. Examples of the computer readable recording medium may include magnetic media such as hard disk, floppy disk, and magnetic tape, optical media such as CD-ROM and DVD, magneto-optical media such as floptical disk, and hardware devices such as ROM, RAM, flash memory or the like which are especially configured to store and perform the program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

A number of embodiments have been described above. Nevertheless, it should be understood that various modifications may be made to these embodiments by those having ordinary skill in the art. For example, suitable results may be achieved if the described techniques are performed in a different order and/or if components in a described system, architecture, device, or circuit are combined in a different manner and/or replaced or supplemented by other components or their equivalents.

Therefore, other implementations, other embodiments, and claims and their equivalents fall within the scope of the following claims.

The invention claimed is:

1. A method of generating pattern data which is performed by an apparatus for generating the pattern data, the method comprising:
   (a) receiving input data;
   (b) determining pattern information based on the input data, and generating the pattern data including the determined pattern information;
   (c) transmitting the generated pattern data to an apparatus for reproducing the pattern data,
   wherein, in the determining of the patent information based on the input data and the generating of the pattern data including the determined pattern information, the input data is analyzed and pattern time interval information indicating a time interval at which a pattern is to be output and pattern level information indicating an intensity of the pattern are determined based on an analysis result,
   wherein when the input data is sound data, a target frequency is determined from among frequencies constituting the sound data, sound data of the target frequency is filtered, and the pattern level information and the pattern time interval information from the filtered sound data are determined based on a threshold, and
   wherein when the input data is touch input data, retention time information of touch input and time interval information of the touch input from the touch input data are extracted, the pattern data is generated based on the retention time information and the time interval information, and output information of a light pattern is determined based on the retention time information and the time interval information.

2. The method of claim 1, wherein the pattern data comprises pattern information on at least one of a haptic pattern applied to an actuator of the apparatus for reproducing the pattern data or the light pattern applied to a light source of the apparatus for reproducing the pattern data.

3. The method of claim 1, in the determining of the patent information based on the input data and the generating of the pattern data including the determined pattern information, wherein lighting color information of the light pattern is determined based on the target frequency and output time information of the light pattern is determined based on the pattern time interval information.

4. The method of claim 1, further comprising setting a reproduction start time of a haptic pattern based on the retention time information and setting a reproduction stop time of the haptic pattern based on the time interval information.

5. The method of claim 1, wherein when the input data is the touch input data, lighting color information of the light pattern is determined based on an intensity of the touch input.

6. The method of claim 1, wherein when the input data is user pattern setting data, the pattern level information and the pattern time interval information are determined based on the user pattern setting data and the pattern data is generated based on the determined pattern level information and pattern time interval information.

* * * * *